(12) United States Patent
Okino et al.

(10) Patent No.: US 11,961,284 B2
(45) Date of Patent: Apr. 16, 2024

(54) TASK APPROPRIATENESS DETERMINATION APPARATUS

(71) Applicant: SUBARU CORPORATION, Tokyo (JP)

(72) Inventors: Shinichirou Okino, Tokyo (JP); Tomoki Hosotani, Tokyo (JP); Tomohiro Kira, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 99 days.

(21) Appl. No.: 17/675,711

(22) Filed: Feb. 18, 2022

(65) Prior Publication Data
US 2022/0284700 A1    Sep. 8, 2022

(30) Foreign Application Priority Data
Mar. 4, 2021  (JP) ................................ 2021-034561

(51) Int. Cl.
*G06V 10/25*     (2022.01)
*G06Q 10/0631*   (2023.01)
(Continued)

(52) U.S. Cl.
CPC ...... *G06V 10/7753* (2022.01); *G06Q 10/063114* (2013.01); *G06Q 50/04* (2013.01);
(Continued)

(58) Field of Classification Search
CPC .. G06V 10/25; G06V 10/764; G06V 2201/06; G06V 10/806; G06V 10/776;
(Continued)

(56) References Cited

U.S. PATENT DOCUMENTS

2019/0219517 A1    7/2019  Horiguchi et al.
2021/0067608 A1*   3/2021  Fleck ................... G06F 11/3452
(Continued)

FOREIGN PATENT DOCUMENTS

WO    2018062238 A1    5/2018

OTHER PUBLICATIONS

O. Erkent, D. Shukla and J. Piater, "Visual task outcome verification using deep learning," 2017 IEEE/RSJ International Conference on Intelligent Robots and Systems (IROS), Vancouver, BC, Canada, 2017, pp. 4821-4827, doi: 10.1109/IROS.2017.8206357. (Year : 2017).*

*Primary Examiner* — Molly Wilburn
*Assistant Examiner* — Ahmed A Nasher
(74) *Attorney, Agent, or Firm* — Rimon P.C.

(57) ABSTRACT

A task appropriateness determination apparatus includes a first learning unit causing artificial intelligence (AI) to learn image information of an index indicating a target object in a task appropriately completed state, an appropriate image provider providing an image possibly including the target object in the appropriately completed state and the index, a second learning unit causing the AI to detect an image where the index is present from the provided image after learning of the index, and learn image information of the target object in the image where the index is present, an image capturing unit capturing an image of a region including the target object and the index at least after the task, and a task appropriateness determiner determining that the task has been appropriately performed in response to detection by the AI of the target object roughly identical to the learned target object in the appropriately completed state.

5 Claims, 4 Drawing Sheets

(51) Int. Cl.
  *G06Q 50/04*   (2012.01)
  *G06V 10/774*  (2022.01)
  *G06V 20/64*   (2022.01)
  *G06V 20/70*   (2022.01)
  *G06V 40/10*   (2022.01)
  *G06V 40/20*   (2022.01)
  *G08B 7/06*   (2006.01)

(52) U.S. Cl.
  CPC .............. *G06V 10/25* (2022.01); *G06V 20/64* (2022.01); *G06V 20/70* (2022.01); *G06V 40/10* (2022.01); *G06V 40/28* (2022.01); *G08B 7/06* (2013.01)

(58) Field of Classification Search
  CPC ...... G06V 10/7753; G06T 2207/10004; G06T 2207/30108; G06T 2207/30168; G06T 2207/20081; G06N 3/08; G06N 3/045; G06Q 50/04; G06Q 10/06395; Y02P 90/30
  See application file for complete search history.

(56) References Cited

U.S. PATENT DOCUMENTS

2022/0391810 A1* 12/2022 Fujimoto ............... G06Q 50/04
2023/0083349 A1* 3/2023 Kranski ................. G06N 3/008
                 706/14

* cited by examiner

TASK APPROPRIATENESS DETERMINATION APPARATUS

CROSS-REFERENCE TO RELATED APPLICATIONS

The present application claims priority from Japanese Patent Application No. 2021-034561 filed on Mar. 4, 2021, the entire contents of which are hereby incorporated by reference.

BACKGROUND

The disclosure relates to a task appropriateness determination apparatus, and more particularly to a task appropriateness determination apparatus configured to cause artificial intelligence (AI) to learn an image of a target object (object) in an appropriately completed state in which a task has been appropriately performed, and, in response to detection of an image of a target object that is roughly identical to the learned target object in the appropriately completed state in an image captured after the actual task, determine that the task has been appropriately performed.

In the case of performing a certain task in the manufacturing industry, for example, image analysis (image recognition) technology is being used for an apparatus or method for determining whether the task has been appropriately performed. For example, International Publication No. WO2018/062238 A1 describes technology that, when it is determined by an image analysis that a worker is performing an irregular task different from a standard task (which is inspection in this case), an image of the contents of the irregular task is captured with a wearable camera worn by the worker in order to investigate afterwards the cause and contents of the occurrence of the irregular task. In this technology, whether an image of a work captured with the above-mentioned wearable camera is a target of inspection, which is the standard task, is determined using image determination.

SUMMARY

An aspect of the disclosure provides a task appropriateness determination apparatus configured to cause artificial intelligence to learn an image of a target object in an appropriately completed state in which a task has been appropriately completed, and, in response to detection of an image of the target object that is roughly identical to the learned image of the target object in the appropriately completed state, determine that the task has been appropriately performed. The task appropriateness determination apparatus includes a first learning unit, an appropriate image provider, a second learning unit, an image capturing unit, and a task appropriateness determiner. The first learning unit is configured to cause the artificial intelligence to learn image information of an index indicating presence of the target object in the appropriately completed state. The appropriate image provider is configured to provide an image possibly including an image of the target object in the appropriately completed state and an image of the index. The second learning unit is configured to cause the artificial intelligence to detect an image in which the image information of the index is present from the image provided by the appropriate image provider after learning of the index by the first learning unit, and to cause the artificial intelligence to learn image information of the target object in the image in which the index is present. The image capturing unit is configured to capture an image of a region including the target object and the index at least after the task. The task appropriateness determiner is configured to determine that the task has been appropriately performed in response to detection by the artificial intelligence of the image information of the target object in which the target object in the image captured by the image capturing unit is roughly identical to the pre-learned image information of the target object in the appropriately completed state.

An aspect of the disclosure provides a task appropriateness determination apparatus configured to cause artificial intelligence to learn an image of a target object in an appropriately completed state in which a task has been appropriately completed, and, in response to detection of the image of a target object that is roughly identical to the learned image of the target object in the appropriately completed state, determine that the task has been appropriately performed. The task appropriateness determination apparatus includes circuitry. The circuitry is configured to cause the artificial intelligence to learn image information of an index indicating presence of the target object in the appropriately completed state. The circuitry is configured to provide an image possibly including an image of the target object in the appropriately completed state and an image of the index. The circuitry is configured to cause the artificial intelligence to detect an image in which the image information of the index is present from the provided image after learning of the index, and cause the artificial intelligence to learn image information of the target object in the image in which the index is present. The circuitry is configured to capture an image of a region including the target object and the index at least after the task. The circuitry is configured to determine that the task has been appropriately performed in response to detection by the artificial intelligence of the image information of the target object in which the target object in the captured image is roughly identical to the pre-learned image information of the target object in the appropriately completed state.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

Figure 1:
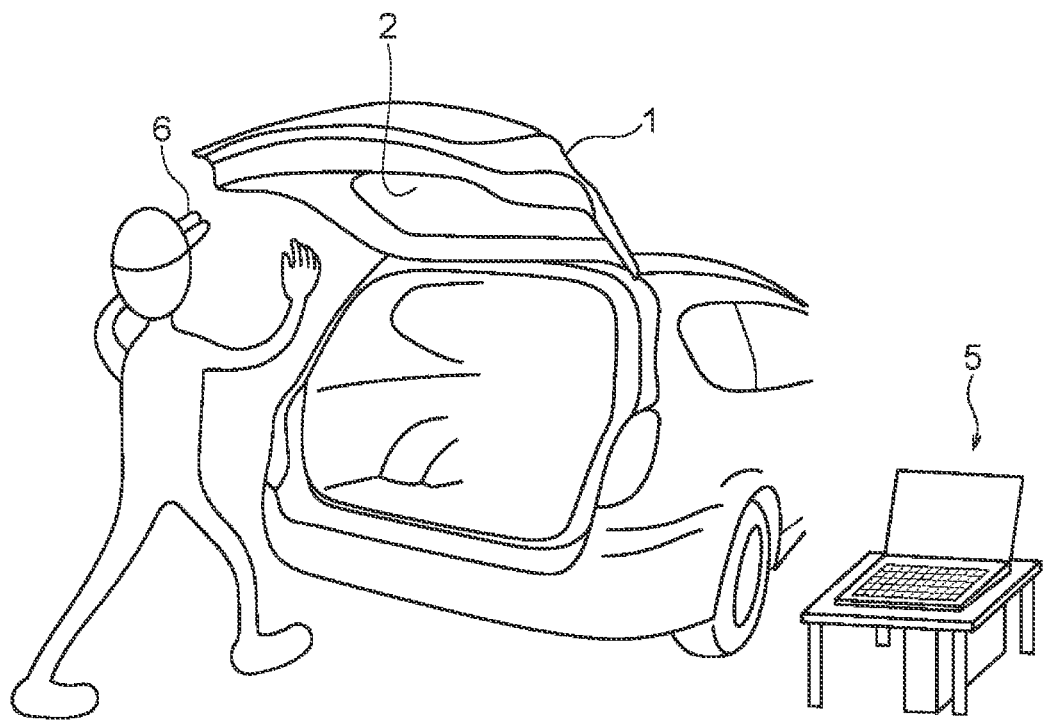
FIG. 1 is a schematic perspective view illustrating an embodiment of a mass-produced automobile manufacturing process to which a task appropriateness determination apparatus according to an embodiment of the disclosure is applied.

It is assumed in International Publication No. WO2018/062238 A1 that a target of inspection is determined by comparing a stored image of an inspection object and an image of a work captured with a wearable camera. Images of the work (object or target object) that are actually captured with the wearable camera are not uniform. For example, if the position, orientation, or appearance of the work in a captured image changes, that change is to be learned broadly in order to be able to detect (estimate) the work in a captured image using the learned contents. Artificial intelligence (hereinafter abbreviated as AI) with a learning function performs machine learning to be able to detect an object from an image (video) or to detect the object's state such as the position or shape. Using this AI function, attempts have been made to determine whether a task has been appropriately performed.

With regard to a predefined task in the manufacturing industry or the like, whether the task has been appropriately performed may be determined using, for example, an image of a target object (object) in a task-completed state. For example, in the case of the task of connecting a harness (wiring material) by fitting two connectors, if the state (morphology, orientation, position, etc.) of the fitted connectors is appropriate, it may be determined that the connecting task has been appropriately performed. Therefore, the AI is caused to learn the connectors in this appropriately fitting state; an image of the connectors fit by the connecting task is captured with, for example, a wearable camera worn by a worker (a fixed camera is also acceptable); and, in response to detection of the connectors in the appropriately fitting state in the captured image, it may be determined that the connecting task has been appropriately performed.

However, in reality, the target object imaged with the above-mentioned wearable camera, namely the fitting connectors, differs from one image to another in the position and/or orientation of the image of the fitting connectors, and/or in the appearance of the fitting connectors. If the appearance of the fitting connectors changes, the shape of (the image of) the fitting connectors in the image changes. Therefore, the accuracy of the above-mentioned task appropriateness determination, or, in one example, the accuracy of target object detection, may be improved by extracting, in order to comprehensively cover such state changes of the target object, the target object from each of numerous images (still images) cut out from a video image and causing the AI to learn various appearances of the target object. Such a learning process is called labeling in the so-called supervised learning. In this labeling, a person who serves as a teacher is expected to, for example, extract images of a target object and identify a region where the target object is visible in each of the images, which is very bothersome. In short, in the case of the above-mentioned fitting connectors, it is necessary to manually extract a large amount of images of the fitting connectors and cause the AI to learn these images.

It is desirable to provide a task appropriateness determination apparatus capable of reducing the labor of machine learning including labeling in the case where task appropriateness determination is performed using image recognition based on artificial intelligence.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

FIG. 1 is a schematic perspective view illustrating a mass-produced automobile manufacturing process to which the task appropriateness determination apparatus according to the embodiment is applied. This process includes the task of fitting connectors 3 on the vehicle interior side of a rear gate 1 to connect a harness (wiring member) 4 in the outfitting line for vehicles such as station wagons. The positions of the connectors 3 are, for example, slightly below a rear glass 2 in the vertical direction of the vehicle. The harness connecting task by fitting the connectors 3 is done from below the rear gate 1 with the rear gate 1 opened, as illustrated in FIG. 1. In the task appropriateness determination apparatus of the embodiment, in response to detection by image recognition of the appropriately fitted connectors 3 in an image after the harness connecting task, it is determined that the task has been appropriately performed.

The task appropriateness determination apparatus of the embodiment is configured by installing necessary application software (hereinafter referred to as application) in a personal computer (hereinafter abbreviated as PC) 5. The main application is an image-recognizable AI-powered application. The PC 5 is a computer system with advanced computational functions. The PC 5 includes a storage device configured to store programs and data, and an input and output device configured to receive signals from external equipment such as a camera and a sensor, and to output signals to external equipment such as a monitor and a loudspeaker. Although the application used in the embodiment is a machine learning application based on "supervised learning", an unsupervised learning application or a deep learning application may be used. Note that "detection" in image recognition is also called "estimation (inference)".

The task appropriateness determination apparatus of the embodiment includes a wearable camera (image capturing unit) 6, which is wearable on a worker to obtain a video (image) of the connectors 3, serving as a target object, and the worker's hand. A desired condition for the wearable camera 6 is that it is capable of capturing an image of a region that is substantially equal to or larger than the worker's field of view. In the embodiment, after the harness connecting task is done by fitting the connectors 3 mentioned above, the worker is expected to do a pointing gesture (action) while looking at the fitted connectors 3. Therefore, when the worker is pointing at the fitting connectors 3, it is conceivable that both the "fitting connectors" and the "worker's hand" are visible to the worker. Thus, the wearable camera 6 is simply disposed to capture an image of a region that is substantially equal to or larger than the worker's field of view. In the embodiment, the wearable camera 6 is mounted on the upper surface of a visor provided in front of the worker's cap in order to capture an image of a region that is substantially equal to or larger than the worker's field of view. Note that an image (video) signal of the wearable camera 6 is transmitted to the PC 5 by a wireless transmission/reception unit (not illustrated) of the related art. In addition, the position at which the wearable camera 6 is worn is not limited to the above. In addition, the image signal may be transmitted to the PC 5 by wire. It is also desirable that the gesture of pointing at the fitting connectors 3 be defined in a task standard, for example.

Figure 2:
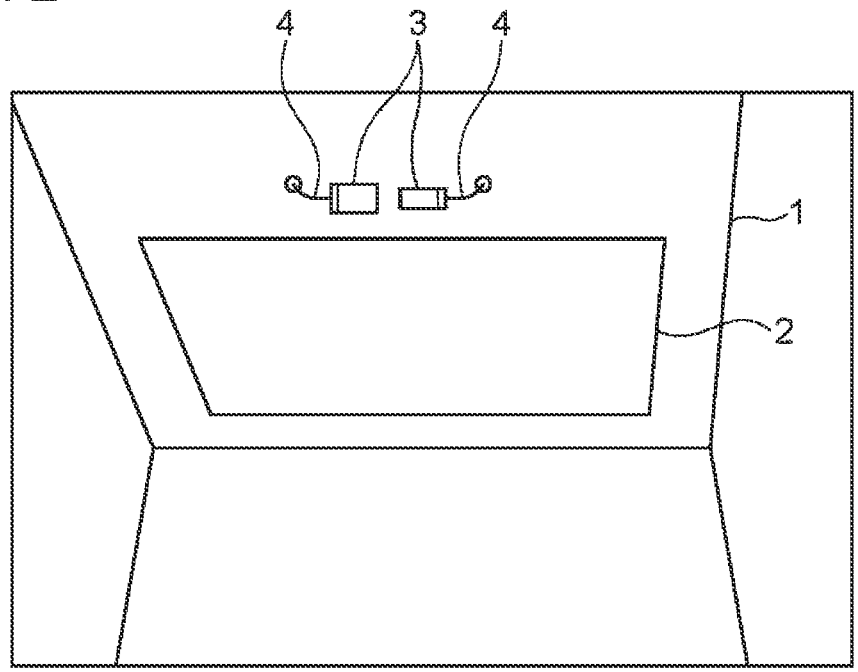
FIG. 2 is an explanatory diagram illustrating an example of an image captured in the manufacturing process illustrated in FIG. 1.
Figure 3:
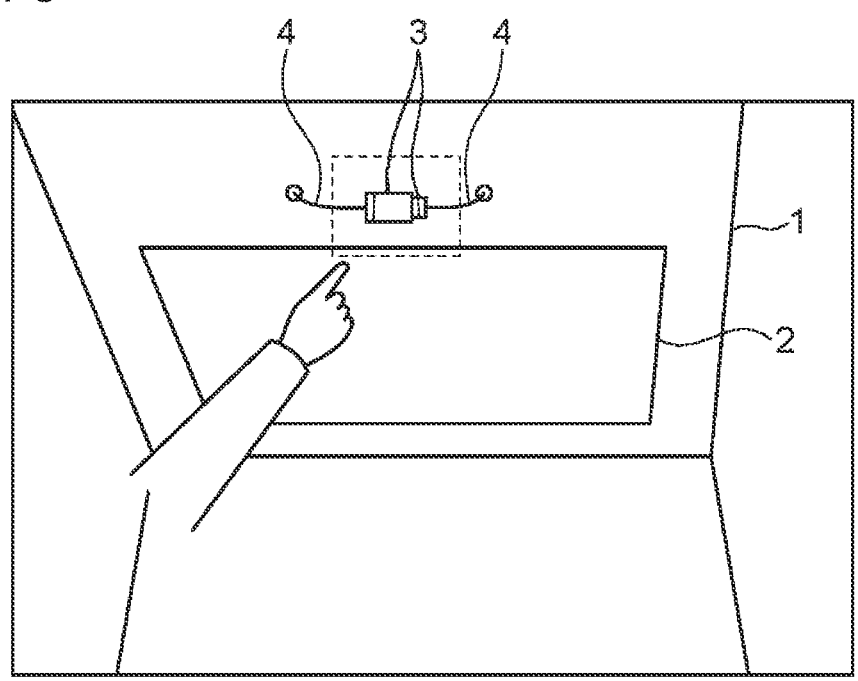
FIG. 3 is an explanatory diagram of a worker's pointing gesture performed as an index indicating the presence of a target object after a task.

FIG. 2 illustrates an example of an image before the harness connecting task is performed, which is captured by the wearable camera 6 and read on the PC 5. This image schematically illustrates an image of the opened rear gate 1 captured from below. A somewhat large rectangle visible in the center of the drawing indicates the rear glass 2; two thin rectangles in the slightly upper part of the image are the connectors 3 to be fit; and line segments connected with the left and right sides of the connectors 3 in the image indicate the harness 4. FIG. 3 illustrates an example of an image after the harness connecting task is performed, which is similarly captured by the wearable camera 6 and read on the PC 5. As described above, the connectors 3 are fit by performing the harness connecting task, and the fitted connectors 3 are pointed at by the worker's hand. In the embodiment, before learning the fitting connectors 3, which serve as the target object, the AI-powered application (first learning unit) is caused to learn the pointing gesture (image information, pixel information). In one example, the AI-powered application is caused to learn the morphology of the worker's hand whose image has been captured in response to the pointing gesture, for example. The hand morphology learned as above is detectable by object-detectable, image-recognizable AI, and, for example, convolutional networks are applicable. Learning of this pointing gesture is performed in order to extract an image in which the pointing gesture is present from images of learning data.

In addition, in the embodiment, as the pointing gesture is learned, the AI-powered application is caused to learn a region as indicated by the broken line in FIG. 3. This region is the location pointed at by the pointing gesture, where the fitting connectors 3 are present. The pointing gesture is an index indicating the location where the fitting connectors 3, which serve as the target object, are present. Thus, along with the pointing gesture, for example, a region pointed at by the worker's finger is set as a rectangular region indicated by the broken line in FIG. 3, and the AI-powered application is caused to learn this region as a location for detecting the fitting connectors 3. That is, the AI is caused to perform labeling at a stage for specifying a region (also called a region of interest) where the presence of the fitting connectors 3, which serve as the target object, is specified. Therefore, before learning the fitting connectors 3 themselves, which serve as the target object, the AI-powered application is caused to learn, as an index, a pointing gesture indicating the presence of the target object. Furthermore, by causing the AI-powered application to learn a certain region according to the pointing gesture as a location where the target object is present, it becomes possible to detect (extract) an image in which the pointing gesture is present, and to detect (specify) a region where the target object is present in the image. Thus, by combining these procedures, the AI-powered application may be caused to perform advanced labeling for learning the target object.

Note that an index indicating the presence of a target object according to an embodiment of the disclosure is a mark indicating that image information of the target object is included in the image, which broadly includes, besides a person's action, a marker visible in the image, a cursor on the monitor screen, and so forth.

In response to detection of a captured image of the fitting connectors 3 and the pointing gesture after the task, and labeling of a location (region) for learning the fitting connectors 3 in that image, the AI-powered application is caused to learn the morphology (shape, position, orientation, etc.) of the fitting connectors 3 (image information, pixel information) present at that location (second learning unit). That is, the AI-powered application extracts a captured image of the fitting connectors 3, which serve as the target object, from images after the harness connecting task, further specify the location where an image of the fitting connectors 3 is captured, and learn the image-captured fitting connectors 3. In learning of the pointing gesture (index), location (region), and fitting connectors (target object) 3 mentioned above, besides a video (image) actually captured with the wearable camera 6, a video or image captured with another camera or a video or image created artificially may be used to perform learning (appropriate image provider).

In the embodiment, task appropriateness determination is performed in response to detection of the pointing gesture after the harness connecting task in an image captured with the wearable camera 6 during or after the harness connecting task. In response to detection of the pointing gesture after the task, as mentioned above, the location (region) where an image of the fitting connectors 3 has been captured is specified (extracted), and, in response to detection of the fitting connectors 3 (image information, pixel information) appropriately fit at that location, it is determined that the harness connecting task has been appropriately performed. If it is determined that the harness connecting task has been performed inappropriately, that fact is reported.

Figure 4:
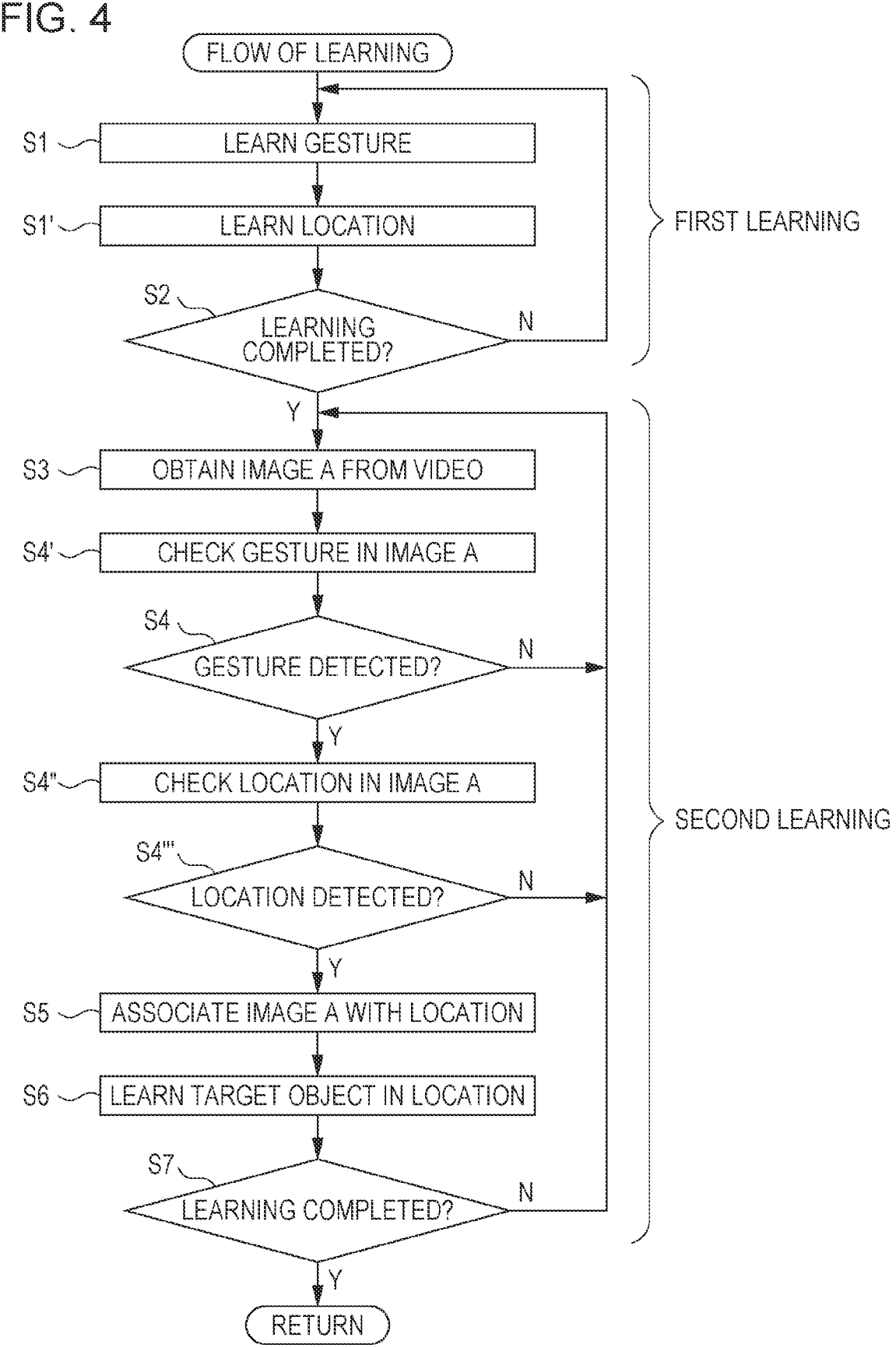
FIG. 4 is a flowchart illustrating the flow of learning in the task appropriateness determination apparatus illustrated in FIG. 1.

FIG. 4 is a flowchart illustrating the flow of learning performed by the AI-powered application installed in the PC 5. Although supervised learning that teaches learning the necessary number of times is indicated in the flowchart, unsupervised learning or deep learning may be used, as mentioned above. In the flow of the learning, at first in steps S1 and S1', the above-mentioned pointing gesture (index) and the location (region) where the fitting connectors 3 are present are learned from an image (video) captured by the wearable camera 6 and read on the PC 5. As the image (video) used for learning, besides an image (video) captured with the wearable camera 6, for example, an image (video) of a similar region captured with another fixed camera or an image (video) created artificially may be used.

Next, the process moves to step S2, and it is determined whether learning of the above-mentioned pointing gesture (index) and the location (region) is completed the necessary number of times. If learning is completed the necessary number of times, the process moves to step S3; otherwise, the process moves to S1 mentioned above. Note that the necessary number of times learning is performed may be set empirically, for example, or may be determined on the fact that the index or region detection (learning) accuracy is greater than or equal to a certain value.

In step S3 mentioned above, an image is obtained from a task image captured with the wearable camera 6, which includes the situation after the task.

Next, the process moves to step S4', and it is determined whether an image of the pointing gesture (index) has been captured in the image obtained in step S3 mentioned above. If it is determined in step S4 that an image of the pointing gesture (index) has been captured, the location of the gesture (index) in the image is checked in step S4". If the location is detected in step S4'", the process moves to step S5; otherwise, the process moves to step S4' mentioned above.

In step S5 mentioned above, the captured image of the pointing gesture (index) is labeled with the location (region) where an image of the fitting connectors 3 has been captured.

Next, the process moves to step S6, and learning of the target object, namely the fitting connectors (object) 3, at the location (region) labeled in step S5 mentioned above is performed.

Next, the process moves to step S7, and it is determined whether learning of the fitting connectors 3 (target object, object) is completed the necessary number of times. If learning is completed the necessary number of times, the process returns; otherwise, the process moves to S3 mentioned above. Note that the necessary number of times learning is performed may be set empirically, for example, or may be determined on the fact that the target object (object) detection (learning) accuracy is greater than or equal to a certain value.

Figure 5:
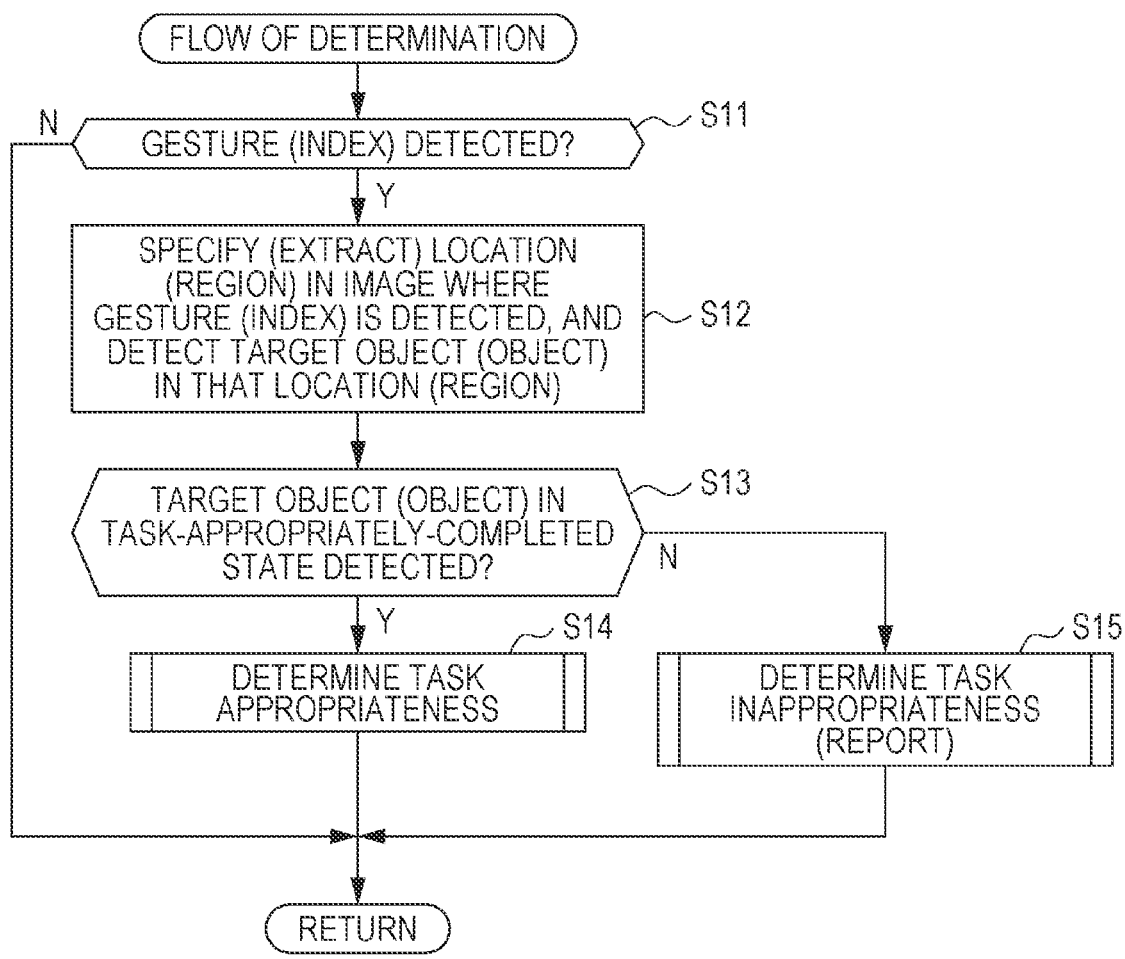
FIG. 5 is a flowchart illustrating the flow of determination in the task appropriateness determination apparatus illustrated in FIG. 1.

FIG. 5 is a flowchart illustrating the flow of task appropriateness determination performed using the AI-powered application installed in the PC 5. In the flow of the task appropriateness determination, at first in step S11, it is determined whether the above-mentioned pointing gesture (index) is detected in an image (video) of the harness connecting task, captured by the wearable camera 6 and read on the PC 5. If the pointing gesture (index) is detected, the process moves to step S12; otherwise, the process returns.

In step S12 mentioned above, the location (region) where the fitting connectors 3 are present in the image in which the above-mentioned pointing gesture (index) is detected is specified (extracted), and the target object in that location (region), namely the fitting connectors 3 (object), is detected.

Next, the process moves to step S13, and it is determined whether the target object, namely the fitting connectors 3 (object), in a task-appropriately-completed state is detected in step S12 mentioned above. If the fitting connectors 3 are appropriately detected, the process moves to step S14; otherwise, the process moves to S15.

In step S14 mentioned above, the process returns after determining that the predetermined task has been appropriately performed on the target object. In accordance with this task appropriateness determination, for example, the vehicle outfitting line may involve separate processing such as automatically transporting the task-completed vehicle to the next process.

In step S15 mentioned above, the process returns after determining that the predetermined task has not been appropriately performed on the target object. In accordance with this task inappropriateness determination, for example, the fact that the task has not been appropriately performed may be reported using, for example, a display, signal light, buzzer, or the like. In addition, for example, the vehicle outfitting line may involve separate processing such as not automatically transporting the vehicle to the next process even when the task is completed.

According to such computational processing, in response to detection of the pointing gesture (index) in an image (video) of the harness connecting task, the location (region) where the fitting connectors 3 are present in the image is specified (extracted), and, in response to detection of the target object, namely the fitting connectors (object) 3, in a task-appropriately-completed state in that location (region), it is determined that the harness connecting task has been appropriately performed; otherwise, it is determined that the harness connecting task has not been appropriately performed. In learning of the fitting connectors 3, by causing the AI-powered application to learn the pointing gesture (index) indicating the presence of the fitting connectors 3 in an image of learning data (teacher data), from this point onward it becomes possible to detect (extract) an image in which the pointing gesture (index) is present from images of the learning data. By specifying the location (region) according to the pointing gesture (index) where the fitting connectors 3 (object), serving as the target object, are considered to be present, the region where the fitting connectors 3 are present may be limited, and, as a result, labeling for subsequent learning is performed. The labor of manual labeling for learning the fitting connectors 3 in combination with detection (extraction) of an image in which the pointing gesture (index) is present is reduced.

As mentioned above, when the task appropriateness determination apparatus of the embodiment determines whether the task is appropriate by causing the AI-powered application to learn the fitting connectors 3 in a task-appropriately-completed state and detecting the fitting connectors 3 roughly identical to the learned fitting connectors 3 in an image after the actual task, for example, the gesture of pointing at the fitting connectors 3 after the harness connecting task serves as a certain index, and, as a pre-learning stage, the AI learns the pointing gesture in an image read into the PC 5. If the pointing gesture is present in a provided image, that image is an image in which the fitting connectors 3 after the harness connecting task are present. By causing the AI to extract an image in which the pointing gesture, namely the index, is present, labeling at the image extraction stage of machine learning is performed by the AI. Therefore, before the AI is caused to learn the fitting connectors 3 in an appropriately completed state after the harness connecting task, the AI is caused to learn an index such as a pointing gesture indicating the presence of the fitting connectors 3, and to detect/extract an image in which the index is present, thereby reducing the labor of manual labeling, and accordingly reducing the labor of machine learning including labeling.

By causing the AI to learn, along with an index such as the above-mentioned pointing gesture, a certain region according to the index, and causing the AI to learn the fitting connectors 3 in the certain region, the capacity (such as the number of pixels) of image learning may be reduced, and accordingly, even low-level AI may learn the fitting connectors 3 with high accuracy. As a result, highly accurate task appropriateness determination based on highly accurate target object detection may be expected. In addition, because the AI performs labeling at the region specifying stage for specifying a region where the fitting connectors 3 are present in an image in which an index such as the above-mentioned pointing gesture is present, the labor of manual labeling is further reduced in the case of performing labeling at the region specifying stage.

In addition, the timing of task appropriateness determination is defined by detecting an index such as the above-mentioned pointing gesture from an image captured with the wearable camera 6 and performing task appropriateness determination using the captured image of the index. Accordingly, the processing performance (such as the processing speed) of image determination may be reduced, compared with the case where task appropriateness determination is performed on all images of a video, for example. In addition, because task appropriateness determination is performed on the basis of detection of the fitting connectors 3 in the certain region according to the index mentioned above, the capacity (such as the number of pixels) of image determination may be reduced. Therefore, even low-level AI may accordingly perform highly accurate task appropriateness determination based on highly accurate target object detection.

In addition, when the task is performed inappropriately, that fact is reported, thereby preventing the occurrence of malfunction in the mass-production automobile manufacturing industry or the like.

Although the task appropriateness determination apparatus according to the embodiment has been described above, the embodiment of the disclosure is not limited to the configuration described in the above embodiment, and various modifications may be made within the scope of the gist of the embodiment of the disclosure. For example, although the gesture of pointing at the connectors 3 that are fitted after the harness connecting task serves as an index in the above embodiment, an index is not limited to this gesture. For example, in the case where the target object is similarly the fitted connectors 3, a rectangular frame surrounding the fitted connectors 3 may serve as an index, or a marker given near the fitted connectors 3 may serve as an index.

In addition, for example, in the case where one process includes certain multiple tasks, and, as a result, there are multiple target objects, if the AI-powered application has sufficient learning capacity and the hardware has sufficient storage capacity, task appropriateness determination may be similarly performed by causing the AI to learn and store these multiple target objects.

If the predetermined task has not been appropriately performed on the target object in the above embodiment, that fact is reported. However, even if the fact that the task is inappropriate is not reported, the fact that the predetermined task has not been appropriately performed is recognizable when, although the task is completed in the vehicle outfitting line, the vehicle is not automatically transported to the next process.

Although the task of connecting the harness 5 by fitting the connectors 3 of the rear gate 1 of the vehicle in the vehicle outfitting line has been described in detail in the above embodiment, the task appropriateness determination apparatus of the embodiment of the disclosure is applicable to any task in any industry as long as the industry is the manufacturing industry. In one example, after the maintenance and inspection task is performed on machinery and equipment, an instrument indicating the operating condition of the machinery and equipment may serve as the target object, or, after combustion equipment is repaired, the combustion condition of combustion gas may serve as the target object.

In addition, although the gesture of pointing at a target object serves as an index indicating the presence of the target object in a task-appropriately-completed state, and the index is machine-learned in the above embodiment, a mark such as a marker other than a person's action may be applied as the index. In one example, two-dimensional code may be used as an index. A pointing gesture involves machine learning because the gesture changes from person to person or depending on the orientation of the hand. On the other hand, two-dimensional code, for example, has a constant shape that remains unchanged, and hence two-dimensional code involves no machine learning. By causing the AI to learn such an index with a constant shape that remains unchanged morphologically using a first learning stage (unit), a second learning stage (unit) that learns a target object in a task-appropriately-completed state may be rule-based, that is, may be caused to do learning according to specified rules. Therefore, for the fact that the first learning stage (unit) which learns the index involves no machine learning, the total labor of learning until the target object in a task-appropriately-completed state is machine-learned may be further reduced. In addition, this rule-based detection may be used for detecting the target object from an image after the actual task is completed.

By the way, for example, the pointing gesture learned in the above embodiment may be used as an index indicating a target object in a task-appropriately-completed state of a task other than the above-mentioned task of fitting the connectors. If a target object in this task-appropriately-completed state is pointed at by a pointing gesture, a target object according to this pointing gesture may be learned similarly with the procedure from step S3 onward of the flowchart illustrated in FIG. 4. The same applies to other indices.

According to the embodiment of the disclosure, in determination of whether a task is appropriate by causing the AI to learn a target object in a task-appropriately-completed state and detecting a target object that is roughly identical to the learned target object in an image after the actual task, in the case where, for example, the action of pointing at the target object in an appropriately completed state serves as an index, the AI learns (image information of) the pointing action as a pre-learning stage. Next, in learning of (image information) of a target object in a task-appropriately-completed state, if the pointing action is present in a provided image, that image is an image in which the target object in a task-appropriately-completed state is present. By causing the AI to detect, that is, extract, an image in which the pointing gesture, namely the index, is present, labeling at the image extraction stage of machine learning is performed by the AI. Therefore, before the AI is caused to learn the target object in a task-appropriately-completed state, the AI is caused to learn an index such as a pointing gesture indicating the presence of the target object in a task-appropriately-completed state, and to detect/extract an image in which the index is present, thereby reducing the labor of manual labeling, and accordingly reducing the labor of machine learning including labeling. In addition, because an index with a constant shape that remains unchanged morphologically is also applicable as an index, by causing the AI to learn this index with a constant shape, learning of the target object in a task-appropriately-completed state may be rule-based learning, thereby further reducing the labor until the target object in a task-appropriately-completed state is learned.

Furthermore, as an index indicating the presence of a target object in the above-mentioned appropriately completed state, for example, the action of pointing at the target object is learned by the AI from an image possibly including the pointing action and the target object in a task-appropriately-completed state. Therefore, for example, when a captured image of a target object on which a task has been appropriately completed and the action of pointing at the target object is provided, the AI detects an image in which the pointing action is detected, and learns image information of the target object from the image.

Furthermore, the AI is caused to learn, along with (image information of) an index such as the above-mentioned pointing action, a certain region according to the index, and to learn (image information of) a target object in the certain region, thereby reducing the capacity (such as the number of pixels) of image learning. Accordingly, even low-level AI may highly accurately learn the target object, and, as a result, highly accurate task appropriateness determination based on highly accurate target object detection may be expected. In addition, because the AI performs labeling at the region specifying stage for specifying a region where the target object is present in an image in which an index such as the above-mentioned pointing action is present, the labor of manual labeling may be further reduced.

According to this configuration, because the timing of task appropriateness determination is defined by detecting (image information of) an index such as the above-mentioned pointing action from a captured image and performing task appropriateness determination using the captured image of the index, the processing performance (such as the processing speed) of image determination may be reduced, compared with the case where task appropriateness determination is performed on all images of a video, for example. In addition, because task appropriateness determination is performed on the basis of detection of the target object in the certain region according to the index mentioned above, the capacity (such as the number of pixels) of image determination may be reduced. Therefore, accordingly, even low-level AI may perform highly accurate task appropriateness determination based on highly accurate target object detection.

Furthermore, because the fact that the task has been performed inappropriately is reported, the occurrence of malfunction may be prevented in the mass-production automobile manufacturing industry or the like.

As described above, according to the embodiment of the disclosure, in determination of the appropriateness of a task by using AI's image recognition of a target object after the task, the AI learns an index corresponding to a label before learning the target object, and detects and extracts an image in which the index is present, thereby reducing the labor of machine learning including labeling.

The task appropriateness determination apparatus can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the task appropriateness determination apparatus. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules.

The invention claimed is:

1. A task appropriateness determination apparatus configured to determine that a task to be performed on a target object is completed, the task appropriateness determination apparatus comprising:
a first learning unit configured to cause artificial intelligence to learn (1) pointers pointing to locations where target objects are found and (2) the locations pointed by the pointers, in order to obtain pre-learned pointer information;
an image provider configured to provide the artificial intelligence with images;
a second learning unit configured to cause the artificial intelligence to:
based on the pre-learned pointer information, detect pointers and locations pointed by the pointers in the images from the image provider; and
in response to detecting the pointers and the locations pointed by the pointers in the images from the image provider, learn target objects in the locations pointed by the pointers to obtain pre-learned target object information;
an image capturing unit configured to capture an image including a target object on which the task is performed and a pointer pointing to the target object; and
a task appropriateness determiner configured to determine that the task has been completed, in response to the artificial intelligence detecting, in the image captured by the image capturing unit, the target object pointed by the pointer based on the pre-learned pointer information and the pre-learned target object information.

2. The task appropriateness determination apparatus according to claim 1, wherein the first learning unit causes the artificial intelligence to learn the pointers and the locations from the images provided by the image provider.

3. The task appropriateness determination apparatus according to claim 1, wherein the task appropriateness determiner is configured to cause the artificial intelligence to:
detect, in the image captured by the image capturing unit, the pointer and the location pointed by the pointer;
detect the target object in the location pointed by the pointer, based on the pre-learned target object information; and
in response to detecting the target object, determine that the task has been completed.

4. The task appropriateness determination apparatus according to claim 1, wherein the task appropriateness determiner comprises a reporting unit configured to report that the task has been completed.

5. A task appropriateness determination apparatus configured to determine that a task to be performed on a target object is completed, the task appropriateness determination apparatus comprising circuitry configured to:
perform first learning to cause artificial intelligence to learn (1) pointers pointing to locations where target objects are found and (2) the locations pointed by the pointers, in order to obtain pre-learned pointer information;
perform image providing to provide the artificial intelligence with images;
perform second learning to cause the artificial intelligence to:
based on the pre-learned pointer information, detect pointers and locations pointed by the pointers in the images from the image providing; and
in response to detecting the pointers and the locations pointed by the pointers in the images from the image provider, learn target objects in the locations pointed by the pointers to obtain pre-learned target object information;
perform image capturing to capture an image including a target object on which the task is performed and a pointer pointing to the target object; and
determine that the task has been completed, in response to the artificial intelligence detecting, in the image captured by the image capturing, the target object pointed by the pointer based on the pre-learned pointer information and the pre-learned target object information.

* * * * *